US008880905B2

(12) United States Patent
Colclasure et al.

(10) Patent No.: US 8,880,905 B2
(45) Date of Patent: Nov. 4, 2014

(54) METHODS FOR PROCESSING PRIVATE METADATA

(75) Inventors: Kaelin L. Colclasure, Sunnyvale, CA (US); John M. Hörnkvist, Cupertino, CA (US); Braden J. Thomas, San Jose, CA (US)

(73) Assignee: Apple Inc., Cupertino, CA (US)

(*) Notice: Subject to any disclaimer, the term of this patent is extended or adjusted under 35 U.S.C. 154(b) by 842 days.

(21) Appl. No.: 12/913,500

(22) Filed: Oct. 27, 2010

(65) Prior Publication Data

US 2012/0110323 A1    May 3, 2012

(51) Int. Cl.
*H04L 29/06* (2006.01)
*G06F 21/62* (2013.01)
*G06F 17/30* (2006.01)
*G06F 21/41* (2013.01)

(52) U.S. Cl.
CPC ........ *G06F 21/6227* (2013.01); *G06F 21/6218* (2013.01); *G06F 21/6209* (2013.01); *G06F 17/30106* (2013.01); *G06F 17/30997* (2013.01); *G06F 17/30091* (2013.01); *G06F 21/6245* (2013.01); *G06F 2221/2107* (2013.01); *G06F 21/41* (2013.01); *G06F 17/30722* (2013.01)
USPC ........... 713/193; 713/153; 713/164; 713/165; 726/26; 726/27; 726/28

(58) Field of Classification Search
CPC ... H04L 63/0428; H04L 9/32; G06F 21/6209; G06F 21/10; G06F 21/6227; G06F 21/6218; G06F 21/6245; G06F 21/41; G06F 2221/2107; G06F 2221/2141; G06F 17/241; G06F 17/30011; G06F 17/30722; G06F 17/30091; G06F 17/301; G06F 17/30106; G06F 17/30997; H04N 21/85406; H04N 21/84; H04N 21/235; H04N 1/4406; H04N 1/32128; Y10S 707/99939

USPC ............ 713/153, 164–165, 189, 193; 726/26–28
See application file for complete search history.

(56) References Cited

U.S. PATENT DOCUMENTS 7,610,310 B2    10/2009    Cameron
7,668,316 B2     2/2010    Choi et al.
(Continued)

FOREIGN PATENT DOCUMENTS

| JP | 2005-275503 | 10/2005 |
| JP | 2009-524125 | 6/2009 |
| KR | 10-2004-024835 | 3/2004 |
| WO | 2007/076459 | 7/2007 |

OTHER PUBLICATIONS

Feng, Ling et al., "Efficient Processing of Secured XML Metadata," OTM Workshops 2003, Lecture Notes in Computer Science, 2003, vol. 2889/2003, pp. 704-717.
(Continued)

*Primary Examiner* — Eleni Shiferaw
*Assistant Examiner* — Hilary Branske
(74) *Attorney, Agent, or Firm* — Blakely, Sokoloff, Taylor & Zafman LLP (57) ABSTRACT

According to one aspect of the invention, a file received from a first user is stored in a storage device, where the file includes private metadata encrypted by a secret key associated with a second user. A private metadata identifier is stored in a predetermined storage location, indicating that private metadata of the file has not been decrypted and indexed. In response to an inquiry subsequently received from the second user, the predetermined storage location is scanned to identify the private metadata identifier based on the inquiry. The encrypted metadata identified by the private metadata identifier is transmitted to the second user for decryption. In response to the metadata that has been decrypted by the second user, the decrypted metadata is indexed for the purpose of subsequent searches of at least one of the metadata and the file.

22 Claims, 7 Drawing Sheets

(56) References Cited

U.S. PATENT DOCUMENTS

2004/0165724 A1    8/2004    Choi et al.
2005/0234907 A1    10/2005    Yamagishi et al.
2006/0004699 A1*    1/2006    Lehikoinen et al. ............ 707/2
2007/0011469 A1*    1/2007    Allison et al. ............... 713/193
2007/0074020 A1    3/2007    Nishimura
2007/0174362 A1*    7/2007    Pham et al. ................ 707/204
2008/0201299 A1    8/2008    Lehikoinen et al.
2011/0119481 A1*    5/2011    Auradkar et al. ........... 713/150

OTHER PUBLICATIONS

PCT International Search Report and Written Opinion of the International Searching Authority mailed Mar. 1, 2012 for PCT/US2011/056960.

International Preliminary Report on Patentability (Chapter 1), mailing date May 10, 2013, for corresponding International Application No. PCT/US2011/056960, 8 pages.

* cited by examiner

METHODS FOR PROCESSING PRIVATE METADATA

FIELD OF THE INVENTION

Embodiments of the invention relate generally to the field of metadata processing; and more particularly, to private metadata processing.

BACKGROUND

Modern data processing systems, such as general purpose computer systems, allow the users of such systems to create a variety of different types of data files. For example, a typical user of a data processing system may create text files with a word processing program such as MICROSOFT WORD or may create an image file with an image processing program such as ADOBE'S PHOTOSHOP. Several other types of files can be created or modified, edited, and otherwise utilized by one or more users, for a typical data processing system. The wide array of files that can be created or modified may present a challenge to a typical user who is seeking to find a particular file which has been created.

Modern data processing systems often include a file management system which allows a user to place files in various directories or subdirectories (e.g. folders) and allows a user to give the file a name. Further, these file management systems often allow a user to find a file by searching for the file's name, or the date of creation, or the date of modification, or the type of file. An example of such a file management system is the Finder program which operates on Macintosh™ computers from Apple® Inc. of Cupertino, Calif. Another example of a file management system program is the WINDOWS EXPLORER program which operates on the Windows™ operating system from Microsoft® Corporation of Redmond, Wash.

Both the Finder program and the Windows Explorer program include a find command which allows a user to search for files by various criteria including a file name or a date of creation or a date of modification or the type of file. However, this search capability searches through information which is the same for each file, regardless of the type of file. Thus, for example, the searchable data for a Microsoft Word file is the same as the searchable data for an Adobe Photoshop file, and this data typically includes the file name, the type of file, the date of creation, the date of last modification, the size of the file and certain other parameters which may be maintained for the file by the file management system.

Certain presently existing application programs allow a user to maintain data about a particular file. This data about a particular file may be considered as metadata because it is data about other data. This metadata for a particular file may include information about the author of a file, a summary of the document, and various other types of information. A program such as Microsoft Word may automatically create some of this data when a user creates a file and the user may add additional data or edit the data by selecting the "property sheet" from a menu selection in Microsoft Word. The property sheets in Microsoft Word allow a user to create metadata for a particular file or document.

Recently, metadata stored in a database may be searched using a metadata search engine. Some metadata (e.g., star rating of a music file) may be private metadata that the originator of the metadata may not want to disclose in a public domain. When a file having private metadata is stored in a public domain, in order to keep the private metadata private, one solution is to strip off the private metadata from the file before storing the file in a publically accessible storage (e.g., file server). However, when the originator retrieves the file from the publically accessible storage, the originator may not be able to recover the private metadata.

SUMMARY OF THE DESCRIPTION

According to one aspect of the invention, a file received from a first user is stored in a storage device, the file including metadata encrypted by an encryption key associated with a second user. The encrypted metadata may be attached to the file as an extended attribute of the file. The file having the encrypted metadata is stored in a content file directory of a file system. In addition, a private metadata identifier or marker is stored in a search index, indicating that there is a private metadata (e.g., encrypted metadata) that has not been decrypted or indexed. In response to an inquiry subsequently received from the second user, the search index is scanned to identify any of the private metadata identifiers in the index. Based on the private metadata identifiers, the encrypted metadata is located and obtained from the corresponding content files in the content file directory of the file system and the encrypted metadata is then transmitted to the second user for decryption. In response to the metadata that has been decrypted by the second user, the metadata is indexed for the purpose of subsequent searches of at least one of the metadata and the file. Further, the private metadata identifiers or markers in the index may be replaced with the decrypted metadata in a plaintext form.

According to another aspect of the invention, it is detected that a user has logged in an operating environment of a data processing system. In response to the detection, an inquiry is transmitted to a file system of the operating environment to inquire any encrypted metadata that is associated with the user. The encrypted metadata is received from the file system and is decrypted using a secret key associated with the user. The decrypted metadata is then transmitted to the file system to be indexed.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments of the invention, private metadata of a file may be encrypted using an encryption key associated with an originator of the private metadata and the encrypted metadata is then attached to the file as part of an extended attribute of the file. Such encrypted metadata may only be decrypted by the originator. When the file is stored in a publically accessible storage, in addition to storing the file in a content file database, a private metadata identifier or marker is stored in a search index, indicating that there is at least one file having private metadata encrypted by a particular key.

Subsequently, when the originator accesses (e.g., logging in or mounting) the publically accessible storage, the search index is scanned to identify any private metadata identifiers or markers. Based on the private metadata identifiers or markers, the encrypted metadata may be located and obtained from the corresponding file or files stored in the file directory. The private metadata may be decrypted by the originator to recover the original metadata in a plaintext form. Thereafter, the original metadata may be indexed and/or stored in the publically accessible storage. The private metadata may be a private label tagged by the originator to a file. When a file having a private label is stored in a storage and browsed by a browser program such as Finder™ of Apple Inc. or Windows Explorer™ of Microsoft Corporation, the private label may be displayed in a special manner indicating that the associated file has been tagged with a private label, even though an ordinary user other than the originator of the private label may not be able to see the details of the private label.

Note that the term of an "originator" of metadata is referred to herein as a user or an agent of the user (e.g., user daemon process) that creates, updates, and/or attaches the metadata with a file. The term of "publically accessible" storage is referred to herein as any storage (e.g., file servers) that is accessible by an entity other than the originator of the metadata.

Figure 1:
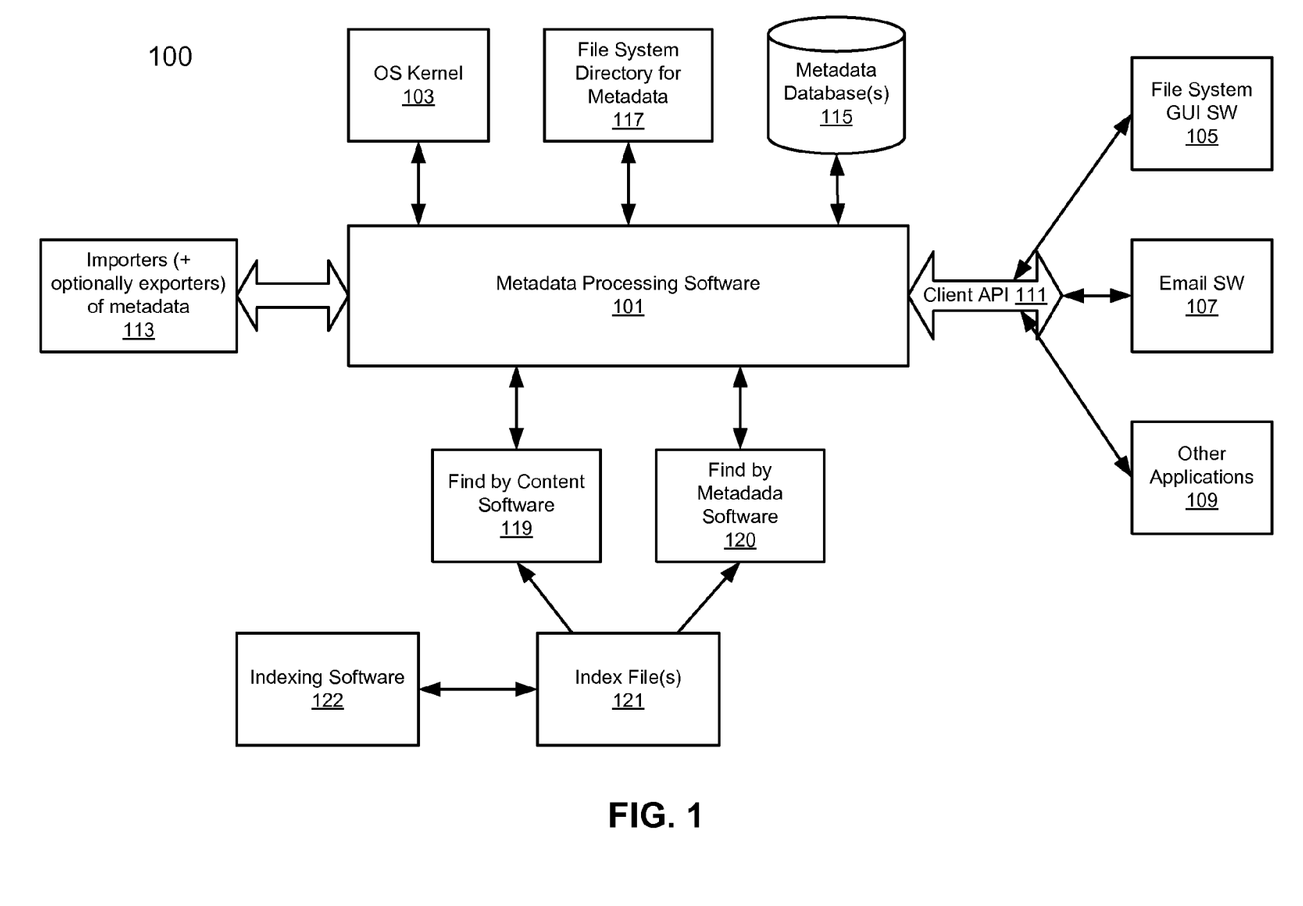
FIG. 1 is a block diagram illustrating an example of architecture for processing metadata according to one embodiment of the invention.

FIG. 1 is a block diagram illustrating an example of architecture for processing metadata according to one embodiment of the invention. Note that various different software architectures may be used to implement the functions and operations described herein. The following discussion provides one example of such architecture, but it will be understood that alternative architectures may also be employed to achieve the same or similar results. The software architecture shown in FIG. 1 is an example, which is based upon the Macintosh operating system. For example, system 100 may be implemented as part of an operating system (OS) of a client (e.g., file system) or alternatively, system 100 may be implemented as part of a server such as a file server that provides content services to one or more clients over a network (e.g., local area network or wide area network such as the Internet).

Referring to FIG. 1, according to one embodiment, architecture 100 includes metadata processing software 101 and operating system (OS) kernel 103, which is operatively coupled to metadata processing software 101 for a notification mechanism. Metadata processing software 101 is also coupled to other software programs such as file system graphical user interface software 105 (which may be the Finder), email software 107, and other applications 109. These applications are coupled to metadata processing software 101 through client application program interface 111, which provides a method for transferring data and commands between metadata processing software 101 and software 105, 107, and 109. These commands and data may include search parameters specified by a user as well as commands to perform searches from the user, which parameters and commands (e.g., search terms or search scope) are passed to metadata processing software 101 through interface 111.

Metadata processing software 101 is also coupled to a collection of importers 113 that extract data from various applications. In one embodiment, a text importer is used to extract text and other information from word processing or text processing files created by word processing programs such as Microsoft Word, etc. This extracted information is the metadata for a particular file. Other types of importers extract metadata from other types of files, such as image files or music files. In one embodiment, a particular importer is selected based upon the type of file which has been created and modified by an application program.

For example, if a data file was created by Photoshop, then an image importer for Photoshop may be used to input the metadata from a Photoshop data file into metadata database 115 through metadata processing software 101. On the other hand, if the data file is a word processing document, then an importer designed to extract metadata from a word processing document is invoked or called upon to extract the metadata from the word processing data file and place it into metadata database 115 through metadata processing software 101. Typically, different importers may be required in order to handle multiple different application programs which are used in a typical computer system. Importers 113 may optionally include multiple exporters which are capable of exporting the extracted metadata for particular types of data files back to property sheets or other data components maintained by certain application programs. For example, certain application programs may maintain some metadata for each data file created by the program, but this metadata is only a subset of the metadata extracted by an importer from this type of data file. In this instance, the exporter may export back additional metadata or may simply insert metadata into blank fields of metadata maintained by the application program.

Software architecture 100 also includes file system directory 117 for metadata. This file system directory keeps track of the relationship between the data files and their metadata and keeps track of the location of the metadata object (e.g. a metadata file which corresponds to the data file from which it was extracted) created by each importer. In one embodiment, metadata database 115 is maintained as a flat file format, and file system directory 117 maintains this flat file format. One advantage of a flat file format is that the data is laid out on a storage device as a string of data without references between fields from one metadata file (corresponding to a particular data file) to another metadata file (corresponding to another data file). This arrangement of data will often result in faster retrieval of information from metadata database 115.

Software architecture 100 of FIG. 1 also includes find by content software 119, which is operatively coupled to database 121 that includes an index of files. The index of files represents at least a subset of the data files in a storage device and may include all of the data files in a particular storage device (or several storage devices), such as the main hard drive of a computer system. The index of files may be a conventional indexed representation of the content of each document. Find by content software 119 searches for words in that content by searching through database 121 to see if a particular word exists in any of the data files which have been indexed. The find by content software functionality is available through metadata processing software 101, which provides the advantage to the user that the user can search concurrently both the index of files in database 121 (for the content within a file), as well as the metadata for the various data files being searched.

In one embodiment, index 121 may be implemented as part of an inverted index. An inverted index (also referred to as postings file or inverted file) is an index data structure storing a mapping from content, such as words or numbers, to its locations in a database file, or in a document or a set of documents. The purpose of an inverted index is to allow fast full text searches, at a cost of increased processing when a document is added to the database. The inverted file may be the database file itself, rather than its index. It is one of the most popular data structures used in information retrieval systems. There are two main variants of inverted indexes: 1) record level inverted index (or inverted file index or just inverted file) contains a list of references to documents for each word; and 2) a word level inverted index (or full inverted index or inverted list) additionally contains the positions of each word within a document. The latter form offers more functionality (like phrase searches), but needs more time and space to be created.

The inverted index data structure is a central component of a typical search engine indexing algorithm. A goal of a search engine implementation is to optimize the speed of the query: find documents where a particular occurs. Once a forward index is developed, which stores lists of words per document; it is next inverted to develop an inverted index. Querying the forward index would require sequential iteration through each document and to each word to verify a matching document. The time, memory, and processing resources to perform such a query are not always technically realistic. Instead of listing the words per document in the forward index, the inverted index data structure is developed which lists the documents per word. With the inverted index created, the query can now be resolved by jumping to the associated word identifier (also referred to as an item identifier) in the inverted index.

The match with the index may employ a data structure called a trie. A trie is a tree structure in which each node of the tree resolves one character of the string being matched. Each internal node consists of a list of characters. Associated with each character is an outgoing link either to another internal node or to a leaf node. Each leaf node holds the result data associated with the prefix leading to that leaf node. To search the trie, one starts at the root node and traverses the tree by following the outgoing link at each node corresponding to the next character in the string to be matched. When no matching outgoing link can be found, the matching has been found.

In one embodiment, referring back to FIG. 1, when a file (e.g., a document or a music file) is received, the file may be stored in storage such as content file directory of the file system. In addition, the metadata associated with the file may be extracted by metadata importer 113 and indexed as part of index 121 by indexing software 122. The metadata may be stored in metadata database 115. The metadata may be in a plaintext form or an encrypted or hashed form (also referred to as a private metadata). If the metadata is not private metadata, it can be indexed by indexing software 112 to be part of index 121, which can be used for subsequent searches based on metadata, for example, via find by metadata software 120.

However, if the metadata is private metadata, it may not be indexed by indexing software 122, since the content of the metadata cannot be determined. In this situation, only the originator of the metadata has the necessary credentials such as an encryption/decryption key or a hash method to decrypt the private metadata. In one embodiment, a private metadata identifier or marker is stored in a specific storage location such as index 121, indicating that there is at least one file having private metadata stored somewhere in the file system, where the private metadata identifier can be used to locate the file and its private metadata. Subsequently, when the originator of the private metadata accesses system 100, the private metadata may be identified via the private metadata identifiers and decrypted by the originator (e.g., with consent of the originator), and the decrypted metadata can then be indexed by indexing software 112 and/or stored in metadata database 115. As a result, although the private metadata cannot be indexed, the private metadata can remain private while being stored in the file system and the metadata can remain with the file.

Figure 2:
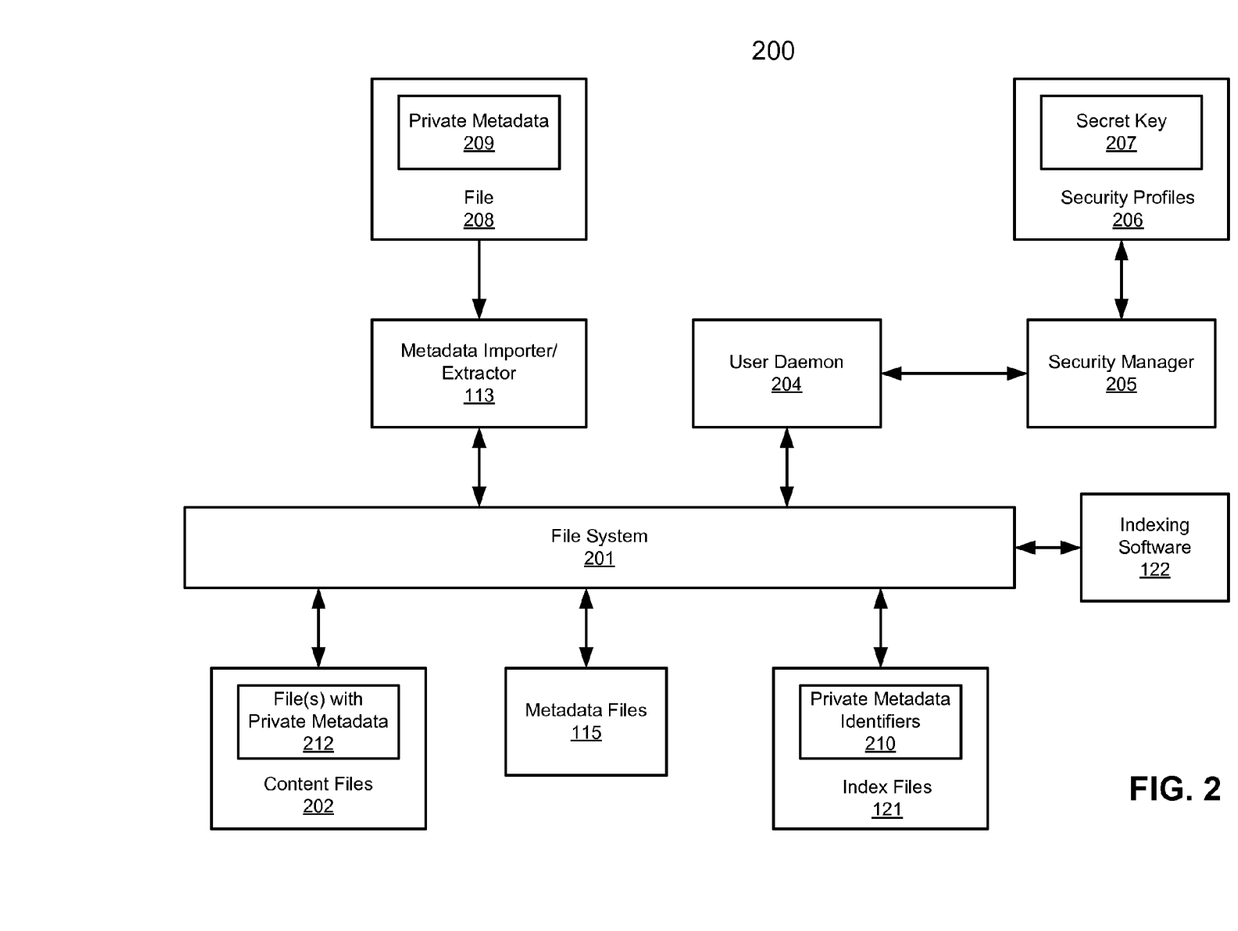
FIG. 2 is a block diagram illustrating a metadata processing system according to another embodiment of the invention.

FIG. 2 is a block diagram illustrating a metadata processing system according to another embodiment of the invention. For example, system 200 may be implemented as part of or communicatively coupled to system 100 of FIG. 1. Referring to FIG. 2, system 200 includes file system 201 for managing content file database 202 and/or metadata database 115, where content database 202 and/or metadata database 115 may be stored in a storage device locally or remotely over a network. In one embodiment, when file 208 having private metadata 209 attached therein is received from a source (e.g., a local user or remote user), in addition to storing file 208 in content database 202 as part of files 212, metadata importer 113 is invoked to extract private metadata 209. If the originator of the metadata is the same user that is currently logged in, a secret key is obtained from security profile 206 via security manager 205. The private metadata 209 is decrypted using the secret key. The decrypted metadata may be indexed by indexing software 122 and stored in index 121 in a plaintext form.

If the originator of the private metadata 209 is not the same user currently logged in, metadata importer 113 may not be able to decrypt the private metadata. In one embodiment, a private metadata identifier or marker is stored in index 121, indicating that there is at least one file (e.g., files 212) stored somewhere in the file system (e.g., content file directories 202) having private metadata that has not been decrypted or indexed. The private metadata identifier can be used to locate the corresponding file (e.g., files 212) that has the associated private metadata.

In one embodiment, file 208 may be received from a first user, and private metadata may be originated by a second user and encrypted by a secret key associated with the second user. For example, file 208 may be music file generated by the first user and private metadata 209 may include a rating of the music file 208 generated by the second user. Since private metadata 209 is in an encrypted form, which can only be decrypted by the second user, private metadata 209 cannot be indexed by indexing software 122, if the second user is not the currently logged-in user.

Subsequently, according to one embodiment, when the second user accesses system 200, user daemon 204 associate with the second user is configured to send a query to file system 201 to obtain a list of private metadata that is associated with the second user. In response to the query, file system 201 may identify any private metadata associated with the second user, for example, based on a user identifier (ID) of the second user, which may be extracted from the query or from communications with user daemon 204 or the associated login process. In one embodiment, based on the user ID, file system 201 may scan index 121 to identify any private metadata identifier (e.g., private metadata identifiers 210) that is associated with the user ID. The private metadata is then identified and located in the corresponding file or files (e.g., files 212) in the content file directory or directories 202. The identified private metadata is then returned to user daemon 204.

User daemon 204 then may communicate with security manager 205 to obtain secret key 207 from security profile 206 of the second user and decrypt the list of private metadata obtained from file system 201. Security manager 205 and/or security profile 206 may be part of login keychain services of Mac OS™ available from Apple® Inc. The decrypted metadata is then sent back to file system 201 and stored in index 121, replacing the corresponding private metadata identifier or identifiers. In addition, the decrypted metadata may be indexed by indexing software 122 for faster searching subsequently.

Note that the above operations performed by user daemon 204 may be performed automatically without user intervention and alternatively, they may be performed only with an express consent (e.g., a user prompt) from the second user. In addition, when the secret key is updated, any subsequent private metadata may be encrypted using the new key. In order to be able to decrypt the private metadata that has been encrypted using an old key, according to one embodiment, all of the old keys are maintained. Note that different private metadata may be encrypted by different secret keys, where each secret key is identified by a universally unique ID (UUID). Multiple UUIDs may be associated with the same user. A user can change its keys by changing the metadata privacy password.

Figure 3:
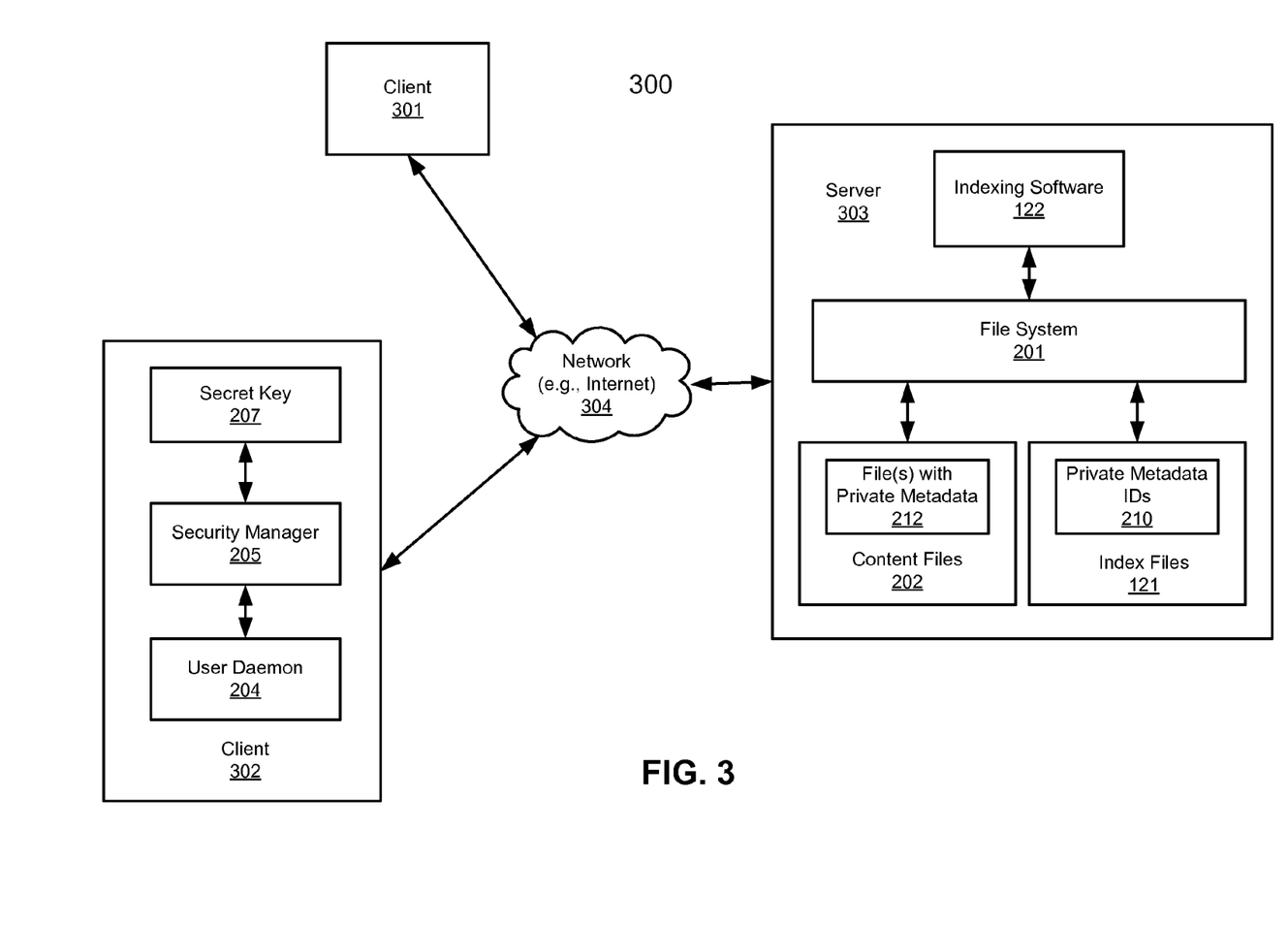
FIG. 3 is a block diagram illustrating a network system according to one embodiment of the invention.

System 200 may be implemented as a multiple user accessible system or workstation. The techniques described above may also be applied to a client and server configuration. FIG. 3 is a block diagram illustrating a network system according to one embodiment of the invention. Referring to FIG. 3, system 300 includes one or more clients 301-302 communicatively coupled to server 303 over network 304, which may be a local area network (LAN) or wide area network (WAN) such as the Internet. Server 303 includes, but is not limited to, file system 201 for managing metadata stored in metadata database 115, where the metadata may also be indexed by indexing software 122 for searching.

Similarly to the configuration as shown in FIG. 2, when a file having private metadata is received at server 303 (e.g., from a first user of client 301), in addition to storing the file with the private metadata in content file directory 202 as part of files 212, a private metadata identifier or marker is also stored in index 121 as part of private metadata identifiers 210. Subsequently, when the second user logs into server 303, in this example, from client 302, user daemon 204 associated with the second user sends a query to server 303 to inquire a list of private metadata associated with the second user. Based on the query, file system 201 may scan index 121 to obtain a list of one or more private metadata identifiers 210. Based on private metadata identifiers 210, file system 201 locates the corresponding files 212 having the private metadata identified by the private metadata identifiers in content file directory 202. Thereafter, a list of private metadata from the files 212 is returned to the second user of client 302.

The private metadata and/or private blob associated with the second user may be identified based on a user ID associated with the second user or a group of users, such as, for example, a UUID of the second user or a group of users, which may be obtained from the query or the login process associated with the second user (e.g., from a user database of an authentication, authorization, and/or accounting entity or server). In one embodiment, user daemon 204 of client 302 is configured to obtain secret key 207 via security manager 205 and to decrypt the private metadata. The decrypted metadata is then transmitted from client 302 to server 303 to be stored in index 121 and indexed by indexing software 122.

According to some embodiments, metadata of a file may be implemented as a part of an extended attribute of the file. That is, the metadata may be considered as an extended attribute of the file by the file system. In one embodiment, metadata, in an encrypted form or plaintext form, may be hashed with a UUID of the originator of the metadata using a predetermined hash algorithm or method (e.g., SHA-1 or MD-5) and the hashed metadata may be stored with the file as an extended attribute. In this way, the file system or operating system can determine a user of particular hashed metadata in the system, since the system knows the hash algorithm; however, an ordinary user may not be able to or be required significant efforts to tell because the ordinary user may not know the hash algorithm.

As a result, a browser program, such as the Finder™ of Apple Inc. or the Windows Explorer™ of Microsoft Corporation, can properly identify that some metadata may be private metadata (e.g., hashed encrypted metadata), semi-private metadata (e.g., hashed plaintext metadata), and public metadata (e.g., plaintext metadata). In addition, based on this information, the browser programs can also display different labels or markers or graphical representations such as icons (e.g., tagged by users or by the system) for different types of metadata. Further, such labels or markers may further include information identifying the originator of particular metadata, which may be determined by the system based on the associated UUID of the originator and the known hash algorithm. Thus, from the graphical user interface (GUI) of the browser programs, an ordinary user can tell which files have private metadata, semi-private metadata, and/or public metadata, etc., although the user may not be able to see the detailed information of the private or semi-private metadata.

Figure 4:
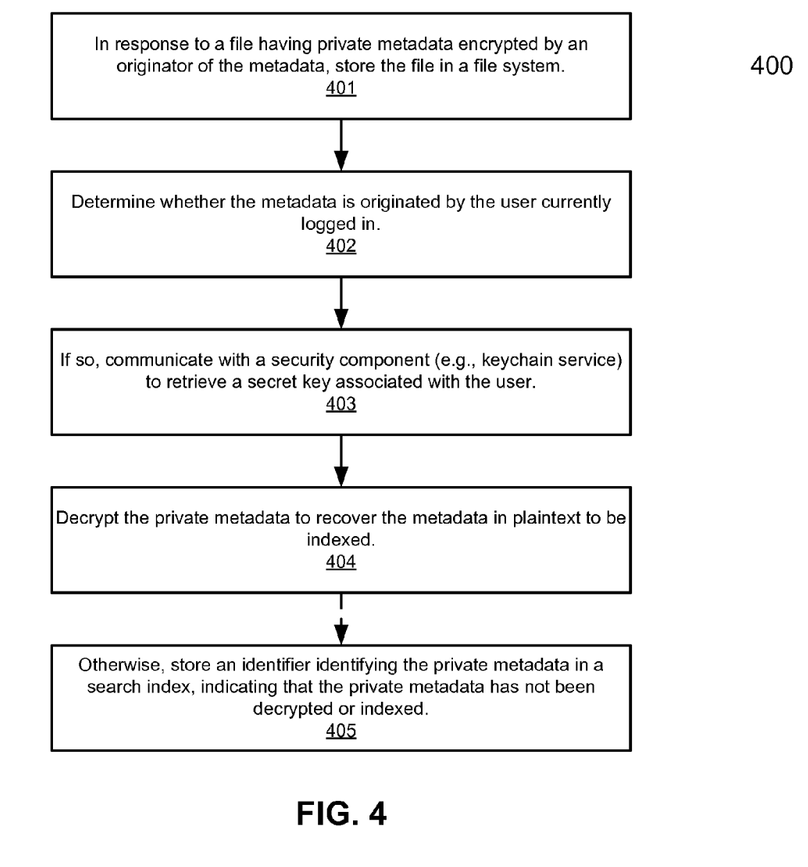
FIG. 4 is a flow diagram illustrating a method for processing metadata according to one embodiment of the invention.

FIG. 4 is a flow diagram illustrating a method for processing metadata according to one embodiment of the invention. For example, method 400 may be performed by system 200 of FIG. 2 or system 300 of FIG. 3. Referring to FIG. 4, at block 401, when a file having private metadata is received, the file is stored in the file system along with the private metadata, where the private metadata has been encrypted by an encryption key of an originator of the metadata. At block 402, it is determined whether the private metadata was originated by the user currently logged in the system. For example, as described above, private metadata may be hashed with a UUID of the originator of the metadata. The system can compare the UUID of the private metadata with the UUID of the currently logged in user to determine whether the private metadata was originated by the currently logged in user. If so, at block 403, the metadata importer or the user daemon of the current user may communicate with a security component (e.g., login keychain services) to retrieve a secret key of the current user that is associated with the encrypted private metadata. As described above, a user may have multiple UUIDs and each UUID may be associated with a secret key. In this embodiment, a UUID associated with the private metadata is used to identify a corresponding secret key for decrypting the private metadata. At block 404, the private metadata is decrypted using the secret key and the decrypted metadata can be used for indexing and/or storing purposes. If the originator of the metadata is not the currently logged in user, at block 405, a private metadata identifier or marker is stored in the index, indicating that the corresponding private metadata has not been decrypted or indexed. Subsequently, when the originator of the metadata logs into the system, the private metadata can be identified and decrypted using a secret key associated with the originator.

Figure 5:
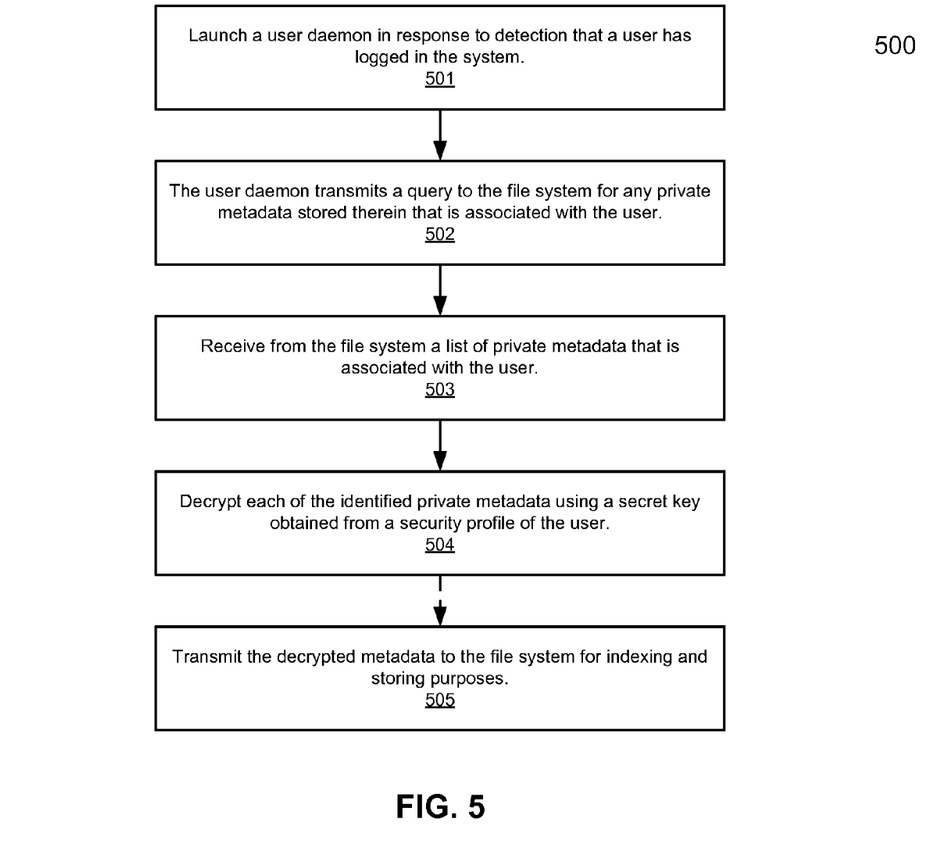
FIG. 5 is a flow diagram illustrating a method for processing metadata according to another embodiment of the invention.

FIG. 5 is a flow diagram illustrating a method for processing metadata according to another embodiment of the invention. For example, method 500 may be performed by system 200 of FIG. 2 or system 300 of FIG. 3. Referring to FIG. 5, in response to detection that a user has logged in, at block 501, a user daemon associated with the user is launched. At block 502, the user daemon transmits a query to the file system for inquiring any private metadata stored therein that is associated with the user. The file system may be a local file system and/or a remote file system over a network. At block 503, a list of private metadata associated with the currently logged-in user is received from the file system. At block 504, the list of private metadata is decrypted using a secret key associated with the currently logged-in user. In one embodiment, the user daemon is configured to communicate with a security component of the system (e.g., login keychain services) to retrieve the secret key associated with the user, which is used to decrypt the metadata. Thereafter, at block 505, the decrypted metadata is transmitted to the file system for indexing and/or storing purposes.

Figure 6:
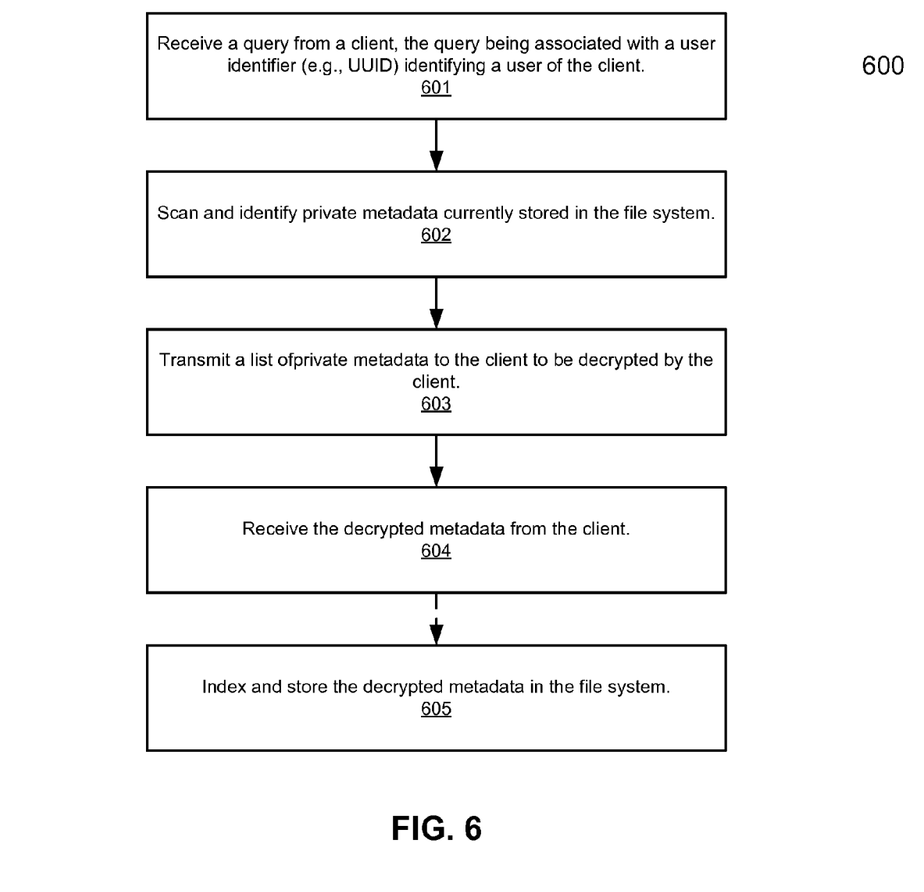
FIG. 6 is a flow diagram illustrating a method for processing metadata according to another embodiment of the invention.

FIG. 6 is a flow diagram illustrating a method for processing metadata according to another embodiment of the invention. For example, method 600 may be performed by system 200 of FIG. 2 or system 300 of FIG. 3. Particularly, method 600 may be performed by server 303 of FIG. 3. Referring to FIG. 6, at block 601, a query is received from a client (e.g., user daemon), where the query is associated with a user identifier (e.g., UUID) identifying a user of the client. In response to the query, at block 602, processing logic is configured to scan and identify any private metadata currently stored in the file system and associated with the user based on the user identifier. In one embodiment, the search index is scanned to identify any private metadata identifiers stored therein based on the user identifier. The files having the private metadata are then located in the content file directory based on the private metadata identifiers and the private metadata can be extracted from the files. At block 603, a list of private metadata is transmitted to the client to be decrypted by the client. At block 604, the decrypted metadata is received from the client and the decrypted metadata is indexed and stored in the file system at block 605.

Figure 7:
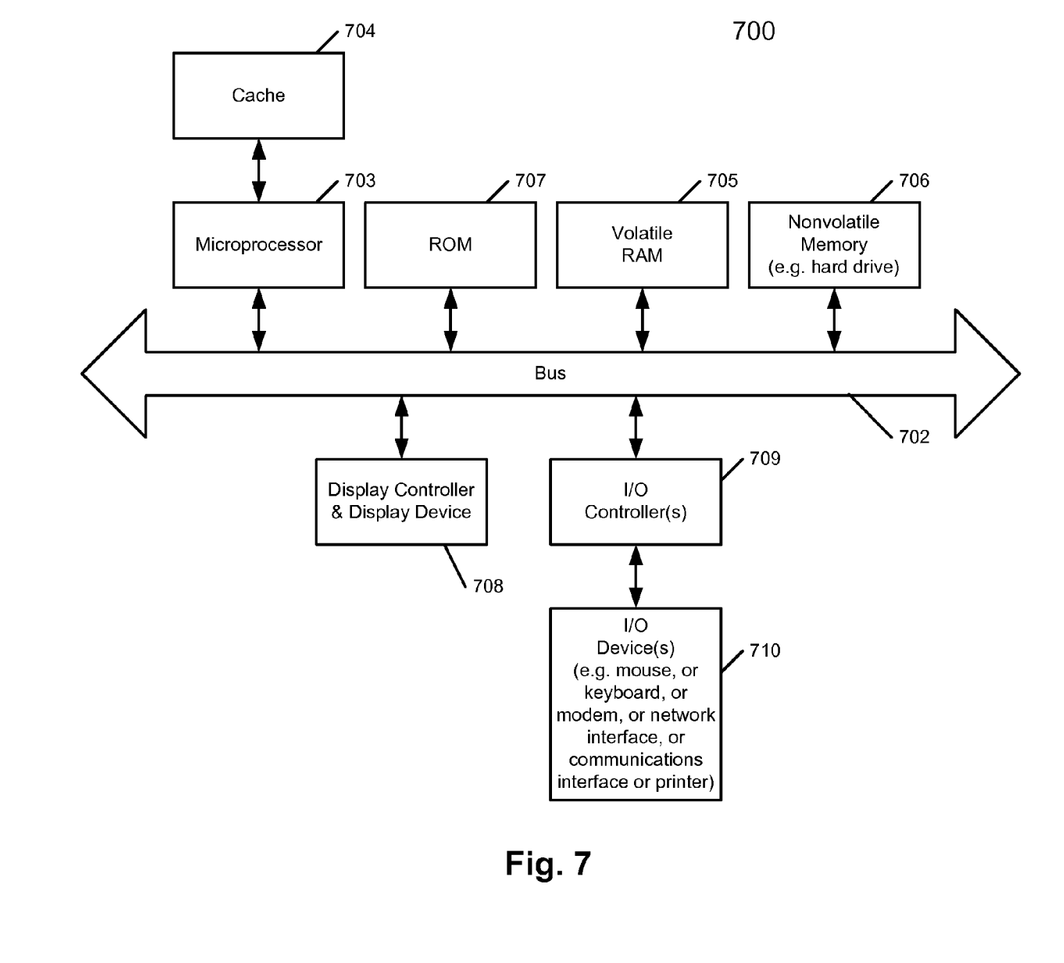
FIG. 7 is a block diagram of a data processing system, which may be used with one embodiment of the invention.

FIG. 7 is a block diagram of a data processing system, which may be used with one embodiment of the invention. For example, the system 700 may be used as system 100 of FIG. 1. Note that while FIG. 7 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 7 may, for example, be an Apple® Macintosh™ computer or MacBook™, or an IBM® compatible PC.

As shown in FIG. 7, the computer system 700, which is a form of a data processing system, includes a bus or interconnect 702 which is coupled to one or more microprocessors 703 and a ROM 707, a volatile RAM 705, and a non-volatile memory 706. The microprocessor 703 is coupled to cache memory 704. The bus 702 interconnects these various components together and also interconnects these components 703, 707, 705, and 706 to a display controller and display device 708, as well as to input/output (I/O) devices 710, which may be mice, keyboards, modems, network interfaces, printers, and other devices which are well-known in the art.

Typically, the input/output devices 710 are coupled to the system through input/output controllers 709. The volatile RAM 705 is typically implemented as dynamic RAM (DRAM) which requires power continuously in order to refresh or maintain the data in the memory. The non-volatile memory 706 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 7 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 702 may include one or more buses connected to each other through various bridges, controllers, and/or adapters, as is well-known in the art. In one embodiment, the I/O controller 709 includes a USB (Universal Serial Bus) adapter for controlling USB peripherals. Alternatively, I/O controller 709 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for processing metadata, comprising:
    storing a file received from a first user in a storage device of a data processing system, the file having private metadata encrypted by a secret key associated with a second user;
    storing a private metadata identifier in a predetermined storage location, indicating that the private metadata of the file has not been decrypted and indexed, wherein the private metadata identifier identifies the private metadata of the file and the second user;
    in response to an inquiry subsequently received from the second user, scanning the predetermined storage location to identify the private metadata identifier based on a user identifier of the second user extracted from the inquiry;
    transmitting the encrypted metadata identified by the private metadata identifier to the second user, wherein the private metadata is decrypted by the second user to recover decrypted metadata; and
    in response to the decrypted metadata received from the second user, indexing by a file system of the data processing system the decrypted metadata for the purpose of subsequent searches of at least one of the metadata and the file in the storage device.

2. The method of claim 1, further comprising storing the decrypted metadata in plaintext in the predetermined storage location, replacing the private metadata identifier, such that the decrypted metadata can be searched, wherein the predetermined storage location is part of a search index.

3. The method of claim 1, wherein the inquiry is received from the second user when the second user logs in and mounts the storage device to inquire about any encrypted metadata associated with the second user that has been encrypted.

4. The method of claim 3, wherein the inquiry includes the user identifier associated with the second user, and wherein the encrypted metadata associated with the second user is identified based on the user identifier of the second user.

5. The method of claim 4, wherein the inquiry is automatically generated by a user daemon associated with the second user when the second user logs in and mounts the storage device.

6. The method of claim 5, wherein the metadata is decrypted by the user daemon using a secret key associated with the second user without user intervention.

7. A non-transitory computer-readable medium having instructions stored therein, which when executed by a computer, cause the computer to perform a method for processing metadata, the method comprising:
    storing a file received from a first user in a storage device of a data processing system, the file having private metadata encrypted by a secret key associated with a second user;
    storing a private metadata identifier in a predetermined storage location, indicating that private metadata of the file has not been decrypted and indexed, wherein the private metadata identifier identifies the private metadata of the file and the second user;
    in response to an inquiry subsequently received from the second user, scanning the predetermined storage location to identify the private metadata identifier based on a user identifier of the second user extracted from the inquiry;
    transmitting the encrypted metadata identified by the private metadata identifier to the second user for decryption, wherein the private metadata is decrypted by the second user to recover decrypted metadata; and
    in response to the decrypted metadata received from the second user, indexing by a file system of the data processing system the decrypted metadata for the purpose of subsequent searches of at least one of the metadata and the file.

8. The computer-readable medium of claim 7, wherein the method further comprises storing the decrypted metadata in plaintext in the predetermined storage location, replacing the private metadata identifier, such that the decrypted metadata can be searched, wherein the predetermined storage location is part of a search index.

9. The computer-readable medium of claim 7, wherein the inquiry is received from the second user when the second user logs in and mounts the storage device to inquire about any encrypted metadata associated with the second user that has been encrypted.

10. The computer-readable medium of claim 9, wherein the inquiry includes the user identifier associated with the second user, and wherein the encrypted metadata associated with the second user is identified based on the user identifier of the second user.

11. The computer-readable medium of claim 10, wherein the inquiry is automatically generated by a user daemon associated with the second user when the second user logs in and mounts the storage device.

12. The computer-readable medium of claim 11, wherein the metadata is decrypted by the user daemon using a secret key associated with the second user without user intervention.

13. A computer-implemented method for processing metadata, comprising:
    storing a private metadata identifier in a predetermined storage location of a data processing system, indicating that private metadata of a file has not been decrypted and indexed, wherein the private metadata identifier identifies the private metadata of the file and a user associated with the private metadata;
    detecting that the user has logged in by a user daemon running within an operating environment of the data processing system;
    transmitting an inquiry from the user daemon to a file system of the operating environment to inquire any encrypted metadata that is associated with the user, the inquiry having a user identifier identifying the user;

receiving by the user daemon encrypted metadata from the file system, wherein the file system searches and identifies based on the user identifier the encrypted metadata that was previously encrypted by the user;

decrypting by the user daemon the metadata using a secret key associated with the user; and transmitting the decrypted metadata from the user daemon to the file system to be indexed by the file system to enable subsequent searching files of other users based on the decrypted metadata.

14. The method of claim 13, further comprising launching the user daemon associated with the user in response to the detection that the user has logged in, wherein the inquiry is transmitted by the user daemon without intervention from the user.

15. The method of claim 14, wherein the user daemon communicates with a security manager of the data processing system to retrieve the secret key associated with the user to decrypt the metadata.

16. The method of claim 13, wherein the file system is a remote file system of a file server over a network.

17. The method of claim 16, wherein the encrypted metadata is associated with a file stored in the file server by another user.

18. A non-transitory computer-readable storage medium having instructions stored therein, which when executed by a computer, cause the computer to perform a method for processing metadata, the method comprising:

storing a private metadata identifier in a predetermined storage location of a data processing system, indicating that private metadata of a file has not been decrypted and indexed, wherein the private metadata identifier identifies the private metadata of the file and a user associated with the private metadata;

detecting that the user has logged in by a user daemon running within an operating environment of the data processing system;

transmitting an inquiry from the user daemon to a file system of the operating environment to inquire any encrypted metadata that is associated with the user, the inquiry having a user identifier identifying the user;

receiving by the user daemon encrypted metadata from the file system, wherein the file system searches and identifies based on the user identifier the encrypted metadata that was previously encrypted by the user;

decrypting by the user daemon the metadata using a secret key associated with the user; and transmitting the decrypted metadata from the user daemon to the file system to be indexed by the file system to enable subsequent searching files of other users based on the decrypted metadata.

19. The computer-readable storage medium of claim 18, wherein the method further comprises launching the user daemon associated with the user in response to the detection that the user has logged in, wherein the inquiry is transmitted by the user daemon without intervention from the user.

20. The computer-readable storage medium of claim 19, wherein the user daemon communicates with a security manager of the data processing system to retrieve the secret key associated with the user to decrypt the metadata.

21. The computer-readable storage medium of claim 18, wherein the file system is a remote file system of a file server over a network.

22. The computer-readable storage medium of claim 21, wherein the encrypted metadata is associated with a file stored in the file server by another user.

\* \* \* \* \*